June 14, 1966 M. C. SANZ 3,255,787
MICROPIPETTE FILLING OR DISPENSING APPARATUS
Filed Jan. 21, 1964

INVENTOR.
Manuel C. Sanz
BY
ATTORNEYS

United States Patent Office 3,255,787
Patented June 14, 1966

3,255,787
MICROPIPETTE FILLING OR DISPENSING APPARATUS
Manuel C. Sanz, 46 Ave. Tournay, Chambesy, Geneva, Switzerland
Filed Jan. 21, 1964, Ser. No. 339,245
3 Claims. (Cl. 141—25)

This invention relates to a micropipette or similar measuring device.

Among the objects of the invention is to provide a micropipette device which is operable to withdraw liquids to be measured from a source of supply, to by-pass all but a precisely measured amount of said liquids and to discharge the measured amount into the space or container where it is desired.

Among other objects of the invention is to provide a measuring device with stand-up base having pipette means for measuring liquid held therein in a position spaced from the base and having means for filling and discharging said pipette as desired.

The objects of the invention are attained by providing a bottle or similar vessel made of elastomeric material and having a mouth fitted with a cap with a chamber member attached above the mouth by means of the cap; a measuring tube is fitted in said chamber member and has its first or inner end opening within said chamber and its second or outer end open to the outside. Means is provided to normally seal the chamber member from the bottle in the region of the mouth of the latter, but a tubular valved connection is provided between the bottle and the chamber member so that when said valve is opened, suction produced by the tendency of the compressed bottle to resume its normal state withdraws air from said chamber member and draws liquid into said measuring tube if the outer end thereof is immersed in such liquid. Means is also fitted to said chamber member to discharge liquid from said measuring tube. Preferably the means which seals the chamber member from the bottle in the region of the mouth of the bottle comprises an overflow vessel adapted to collect excess liquid which passes through the inner end of said measuring tube.

The bottle portion of applicant's device may be made of any flexible plastic material having sufficient resilience to tend to return to its original state when the walls thereof are compressed. Polyethylene, polypropylene and similar plastic materials are very well suited for the production of the bottle portion. Polyethylene and polypropylene are also well suited for the production of the chamber member and the measuring tube although these members do not have to be flexible and can be made of glass or relatively hard plastic materials such as polystyrene, polymethylmethacrylate, etc.

The measuring tube may be of such a size as to hold 0.005 to 0.25 ml. of liquid although it is quite obvious that much larger or smaller measuring tubes can be employed also.

The objects set forth above together with other objects and advantages of the invention will be made apparent in the detailed description of the invention which follows when considered in connection with the accompanying drawings in which.

Figure 1:
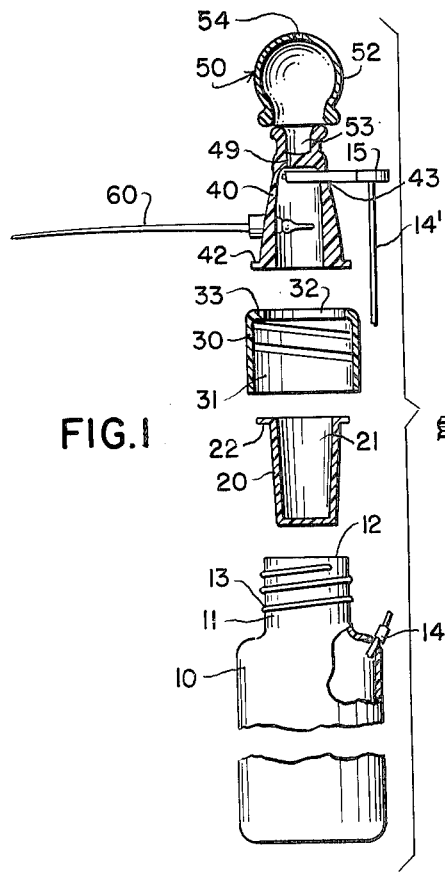
FIG. 1 is an exploded view of a device made according to the invention.

The exploded view of FIG. 1 shows from the bottom upward, the suction creating bottle or vessel 10, the seal and overflow vessel 20, the cap 30, the chamber forming means 40 and the pressure creating means 50 for expelling liquid held in the pipette or measuring tube 60 which is fixed in the chamber forming means 40. The bottle or vessel 10 has a neck 11 of reduced diameter ending in a rim 12 which defines the mouth of the bottle. The neck includes helical threads 13 or similar means to form an interlocking engagement with the interior threads 31 or similar cooperating means on the cap 30. Sealed in the side or upper portion of bottle 10 is the tube 14 which is either connected to or is integral with the tube 14' of chamber 40.

The vessel 20 is open at the top 21 and is formed with exterior peripheral flanges 22 adapted to rest on the rim 12 of bottle 10. If desired, the vessel 20 can be permanently united to the rim 12 of bottle 10. The cap 30 has the opening in the top thereof which defines the interior flange 33 adapted to overlap the flange 22 of vessel 20 and the flange 42 of chamber 40. The chamber member 40 may be made integral with the cap 30.

Figure 3:
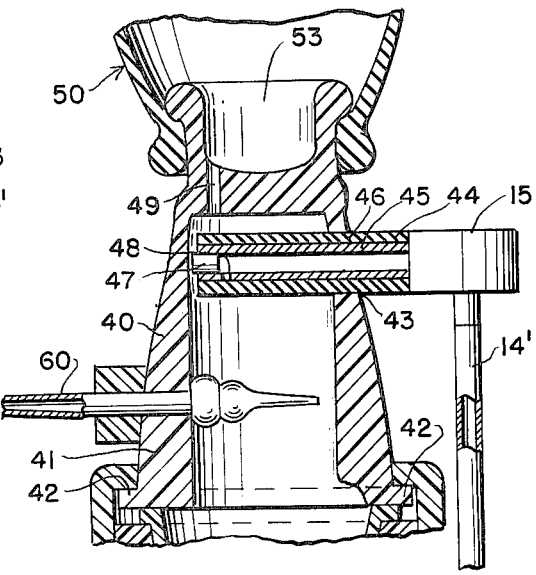
FIG. 3 is a detail view of the chamber and valve structure of the device.

The chamber forming means 40 has at least one relatively thick walled portion 41 into which the measuring tube 60 may be securely anchored. Near the upper portion of chamber 40 is an opening 43 into which valve means 44 is fitted. Valve means 44 (see FIG. 3) comprises an interior stiff tube 45 which may be of metal and a soft elastomeric sleeve member 46. The inner end of tube 45 is closed by means of plug 47 and this tube 45 also contains an opening 48 spaced inwardly from the end thereof and facing downwards. The tube 14' is connected to the tube 45 by means of coupling 15. The chamber forming means 40 is closed at the top portion except for opening 49. The opening 49 cooperates with the soft sleeve 46 of valve means 44 to interrupt communication between the air pressure bulb 52 and the interior chamber of means 40 when the valve means 44 is pivoted away from its normally horizontal position by pressure applied to the coupling 15. As shown in somewhat exaggerated form in FIG. 4, the pivotal movement of valve means 44 also establishes communication between the interior of chamber 40 and the bottle 10, by means of the opening 48, tube 45, coupling 15 and tubes 14' and 14. Rim 53 is formed on chamber member 40 surrounding the opening 49.

The pressure creating means 50 comprises the bulb 52 fitted on the rim 53 and provided with a hole 54 which is closed when an operator presses his finger on the top of said bulb 52. As particularly shown in FIG. 4, the measuring tube 60 may be formed with an expanded exterior portion 61 adjacent the inner end thereof. The measuring tube 60 is then securely held by the washers 62 and 63 on opposite sides of the wall 41 of chamber means 40.

Figure 2:
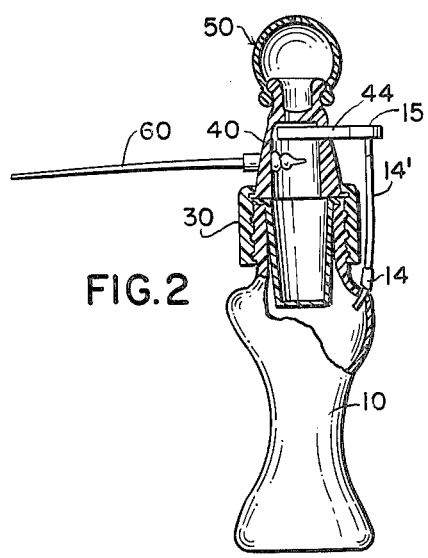
FIG. 2 is an assembled view of the device of FIG. 1 and illustrates a preliminary step in the operation of the device.
Figure 4:
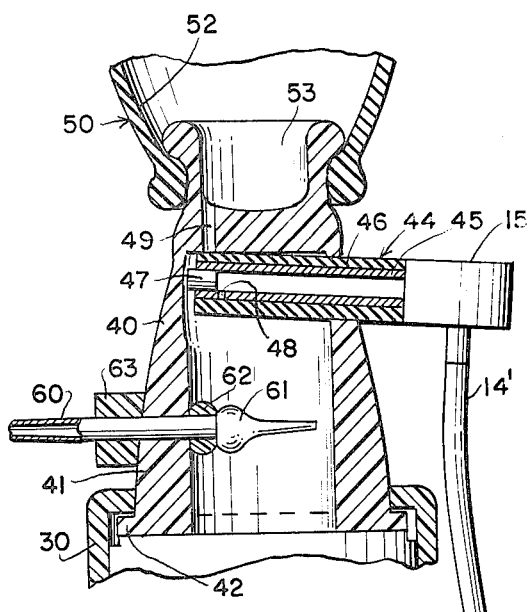
FIG. 4 is a detail view similar to FIG. 3 but illustrating the position of the parts during a filling step.

In operation, the device is assembled as shown in FIG. 2 and the walls of bottle or vessel 10 are compressed as also shown in FIG. 2. When the walls of vessel 10 are compressed, air is forced through tubes 14, 14', coupling 15, tube 45, hole 48, chamber 40, bulb 52 and hole 54. On releasing, the walls of bottle 10 remain compressed although they are resilient because the interior of bottle 10 is substantially sealed off from the outside and from the chamber means 40. Thus, entrance of air through the mouth of bottle 10 is prevented by vessel 20 and entrance of air from chamber 40 and tube 14 is prevented by the seal which tube 46 provides over hole 48 of tube 45. While in the condition shown in FIG. 2, the outer end of measuring tube 60 is inserted below the surface of a liquid to be withdrawn and measured and coupling 15 is pressed downwardly as shown in FIG. 4, when thus pressed the end of valve means 44 pivots due to the stiffness of tube 45 so that the soft elastomeric sleeve 46 closes opening 49 and at the same time this sleeve 46 is distorted in the region of hole 48 so that air from chamber 40 is drawn into bottle 10, thus drawing liquid into measuring tube 60. The end of measuring tube 60 is maintained in the liquid to be withdrawn long enough to fill said measuring tube 60. Any excess liquid falls into the trap chamber or vessel 20 and is thus kept free of bottle 10, tubes 14, 14', coupling 15, tube 45, etc. When coupling 15 is released before the end of measuring tube 60 is withdrawn from the liquid to be measured, the hole 48 is closed, thus separating chamber 40 from bottle 10, and at the same time opening 49 is opened which immediately establishes atmospheric pressure in chamber 40. The liquid in measuring tube 60 comes to a stop and is held in said measuring tube by capillary action. In order to discharge the liquid filling measuring tube 60, the bulb 50 is pressed, simultaneously closing opening 54 and applying pressure within chamber 40.

The features and principles underlying the invention described above in connection with specific exemplifications will suggest to those skilled in the art many other modifications thereof. It is accordingly desired that the appended claims shall not be limited to any specific feature or details thereof.

I claim:
1. In a pipette device for withdrawing and then holding and delivering a measured quantity of liquid from a liquid source, the combination comprising,
   bottle means of the type having resilient side walls and a mouth in the upper portion thereof,
   chamber means adapted to fit over the mouth of said bottle means,
   cap means for securing the chamber means to the mouth of said bottle means,
   sealing means closing the mouth of said bottle means with respect to the chamber means,
   tubular communicating means extending from said bottle means to the interior of said chamber means,
   said tubular communicating means including valve means adjacent that end thereof which extends into said chamber, said valve means being operable to establish communication between said bottle means and said chamber means whereby suction created by the compressed walls of the bottle means can be directed to the interior of the chamber means,
   tubular measuring means having one end opening to the interior of said chamber means and its other open end extending outside of said chamber means,
   means operable to increase the air pressure within the chamber of said chamber means when the valve means of said tubular communicating means is not open to said chamber means.

2. The device as claimed in claim 1, wherein said valve means comprises an interior stiff tube and an exterior elastomeric tube, said interior stiff tube being closed at the end but containing a peripheral opening which is normally tightly covered by said exterior tube,
   said interior and exterior tubes extending to the outside of said chamber means whereby the fit between said tubes in the region surrounding the peripheral opening can be distorted to provide communication between the interior of the stiff tube and the interior of the chamber means by pressing those portions of said tubes which is outside said chamber means.

3. The device as claimed in claim 2, wherein said means operable to increase the air pressure within the chamber of said chamber means comprises a compressible bulb means,
   rim means formed on the upper part of said chamber means adapted to receive said bulb means,
   said chamber means containing an opening within said rim means having its first end opening in said chamber and its other end opening into the interior of said bulb means,
   said first end of said opening being positioned directly above the exterior tube of said valve means whereby pressing the outside portion of the tubes of said valve means to provide communication between the chamber means and the interior of the stiff tube of said valve means simultaneously closes the opening in the upper part of said chamber means.

References Cited by the Examiner

UNITED STATES PATENTS 2,964,390 12/1960 Cummings _____ 141—25 X
3,039,500 6/1962 Goldberg _____ 141—26

LAVERNE D. GEIGER, *Primary Examiner.*

H. BELL, *Assistant Examiner.*